United States Patent
Love et al.

(10) Patent No.: US 12,499,465 B2
(45) Date of Patent: Dec. 16, 2025

(54) COMPUTING NETWORKS, ARCHITECTURES AND TECHNIQUES FOR PROCESSING INCENTIVES BASED ON CHANNEL EVENTS

(71) Applicant: SURGETECH M LLC, Loule (PT)

(72) Inventors: Michael Love, Marble Falls, TX (US); Blake Love, Austin, TX (US); Tiago Soromenho, Austin, TX (US)

(73) Assignee: SURGETECH M LLC, Lago (PT)

( * ) Notice: Subject to any disclaimer, the term of this patent is extended or adjusted under 35 U.S.C. 154(b) by 0 days.

(21) Appl. No.: 18/091,049

(22) Filed: Dec. 29, 2022

(65) Prior Publication Data
US 2024/0221019 A1   Jul. 4, 2024

(51) Int. Cl.
*G06Q 30/0207* (2023.01)
*G06Q 30/0202* (2023.01)
*G06Q 30/0211* (2023.01)

(52) U.S. Cl.
CPC ..... *G06Q 30/0223* (2013.01); *G06Q 30/0202* (2013.01); *G06Q 30/0211* (2013.01)

(58) Field of Classification Search
CPC .......... G06Q 30/0223; G06Q 30/0202; G06Q 30/0211
USPC .......... 705/14.13, 14.66, 14.42; 725/32, 10; 707/999.102; 455/566; 709/203
See application file for complete search history.

(56) References Cited

U.S. PATENT DOCUMENTS

| | | | |
|---|---|---|---|
| 8,671,423 B1 * | 3/2014 | Chang | H04N 21/4755 725/32 |
| 10,949,894 B1 | 3/2021 | Bansal et al. | |
| 11,579,611 B1 | 2/2023 | Lopez et al. | |
| 2005/0273380 A1 | 12/2005 | Schroeder et al. | |
| 2006/0282328 A1 | 12/2006 | Gerace et al. | |
| 2008/0294996 A1 * | 11/2008 | Hunt | G06Q 30/02 707/999.102 |
| 2009/0024698 A1 * | 1/2009 | Ho | G06F 16/9577 709/203 |
| 2011/0251887 A1 * | 10/2011 | Paul | G06Q 30/02 705/14.42 |
| 2012/0265580 A1 | 10/2012 | Kobayashi et al. | |
| 2012/0303411 A1 | 11/2012 | Chen et al. | |
| 2013/0055300 A1 * | 2/2013 | Hanina | G06Q 50/01 725/10 |
| 2013/0325624 A1 * | 12/2013 | Cardella | G06Q 30/02 705/14.66 |

(Continued)

OTHER PUBLICATIONS

Michal Wlosik, What is Behavioral Targeting and How Does It Work?, 2021 (Year: 2021).*

(Continued)

*Primary Examiner* — Tarek Elchanti
(74) *Attorney, Agent, or Firm* — Kevin Paganini, Esq.

(57) ABSTRACT

A computerized method comprising: tracking user behavior data of users each using a respective mobile device within a channel; detecting a demand surge in the channel based on channel analysis data for the channel, wherein the channel analysis data for the channel are based channel events for the channel; and generating one or more first incentives for one or more first users of the users based on the demand surge and incentive metrics, wherein the one or more first incentives are configured to change user behavior of the one or more first users. Other embodiments are disclosed herein.

20 Claims, 6 Drawing Sheets

(56) References Cited

U.S. PATENT DOCUMENTS

| | | | |
|---|---|---|---|
| 2014/0195304 | A1 | 7/2014 | Stein et al. |
| 2014/0358637 | A1 | 12/2014 | Kahneman et al. |
| 2015/0170175 | A1 | 6/2015 | Zhang et al. |
| 2016/0124411 | A1 | 5/2016 | Tinnakornsrisuphap et al. |
| 2016/0127534 | A1* | 5/2016 | Celik ............... H04M 1/72436 455/566 |
| 2016/0142492 | A1 | 5/2016 | Fang et al. |
| 2017/0220938 | A1 | 8/2017 | Sainani et al. |
| 2019/0379592 | A1 | 12/2019 | Samadi |
| 2020/0160718 | A1 | 5/2020 | Saleh |
| 2020/0402058 | A1 | 12/2020 | Zhou et al. |
| 2021/0182993 | A1* | 6/2021 | Arian ..................... G06Q 30/02 |
| 2021/0344582 | A1 | 11/2021 | Samadi |
| 2022/0138786 | A1 | 5/2022 | Sawarkar et al. |

OTHER PUBLICATIONS

Userpilot, Best User Behavior Tracking Tools For SaaS And How To Use The Data, 2022 (Year: 2022).*

Valeria Williams, Easily track geo-specific demand with Location Insights, 2022 (Year: 2022).*

Lingelbach, An optimization approach between service level and inventory via simulation: an example from the semiconductor industry, 2017 Thesis (Year 2017).

Liu, Mobility Modeling, Location Tracking, and Trajectory Prediction in Wireless ATM Networks; 1998; IEEE Journal on Selected Areas in Communications, vol. 16, No. 6 (Year 1998).

Meeragandhi, Machine learning approach for attack prediction and classification using supervised learning algorithms, Int. J. Comput. Sci. Commun. 1(2), 247-250 (Year 2010).

Aminikhanghahi et al., A survey of methods for time series change point detection, Knowl Inf. Syst 51, 339-367 (Year: 2017).

Harshdeep Singh, Understanding Gradient Boosting Machines, Towards Data Science, Nov. 3, 2018 (Year: 2018).

Chen, et al. Deep Learning Based Anomaly Detection for Muti-dimensional Time Series: A Survey. Cyber Security CNCERT 2021. Communications in Computer and Information Science, vol. 1506, Springer Singapore (Year: 2022).

* cited by examiner

COMPUTING NETWORKS, ARCHITECTURES AND TECHNIQUES FOR PROCESSING INCENTIVES BASED ON CHANNEL EVENTS

TECHNICAL FIELD

This disclosure is related to computing networks, architectures, and techniques for processing incentives based on channel events, as well as systems, methods, and techniques for the same.

BACKGROUND

Conventional approaches to detecting surges of demand generally are based on detecting an increase in requests for an offering in a particular area. For example, a ride-share company may have an application used by its users, and the ride-share company may detect an increase in requests for rides in a particular area, and can associate that increase in requests with an increase in demand. Based on detecting that increase of demand, the ride-share company may alter pricing for rides in that area for a given time or while the demand remains elevated.

Such conventional approaches are reactionary to the single factor of an increase in requests, and fail to incorporate other factors and sources of data that can provide a more holistic determination of the nature and extent of the surge in demand, let alone incentivize the collection of such other sources of data. Additionally, such conventional approaches typically handle the demand surge solely by increasing prices without considering other possible ways of addressing the demand surge.

BRIEF DESCRIPTION OF DRAWINGS

To facilitate further description of the embodiments, the following drawings are provided, in which like references are intended to refer to like or corresponding parts, and in which.

Figure 1A:
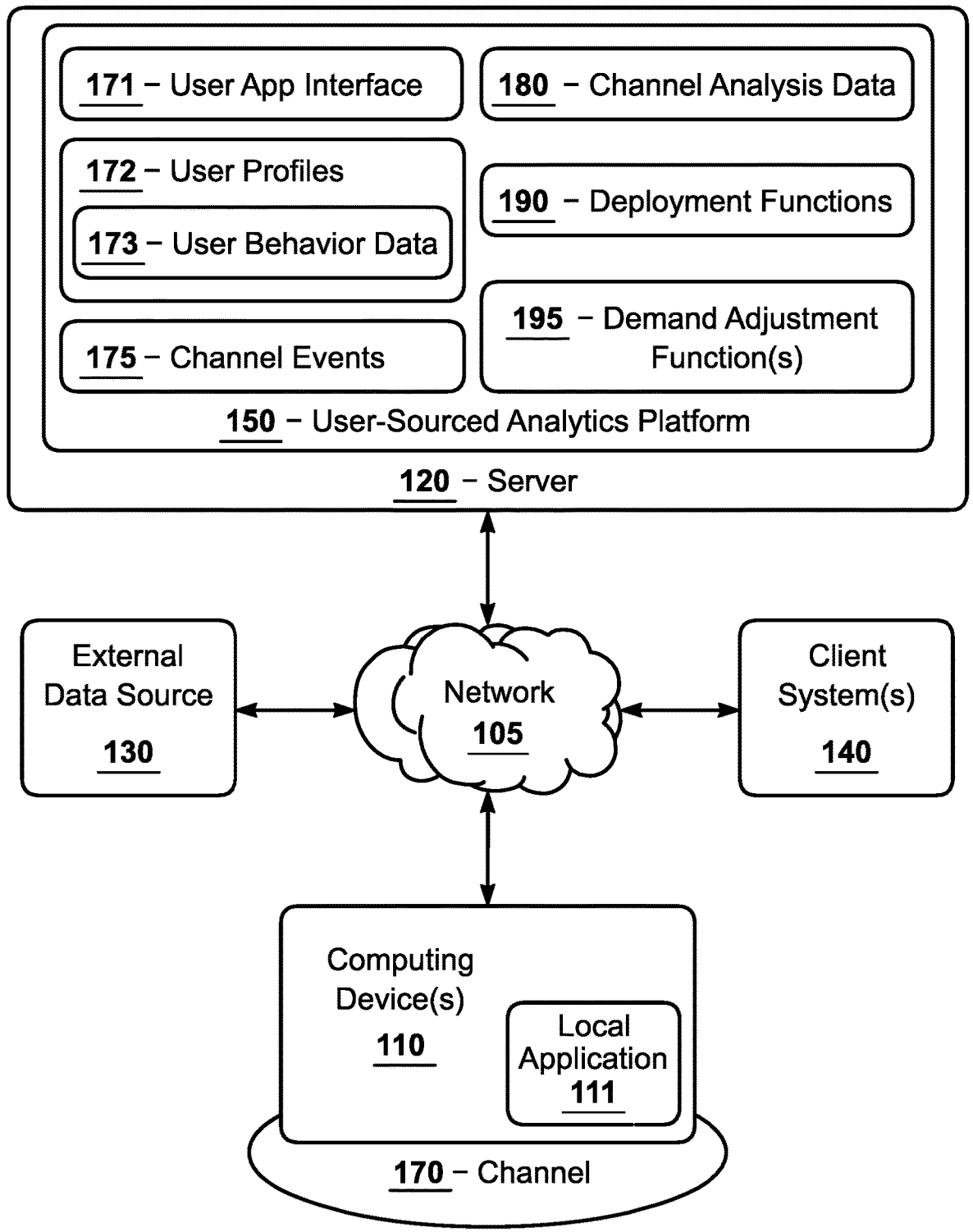
FIG. 1A is a diagram of an exemplary system according to certain embodiments.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein.

The terms "upper," "lower," "left," "right," "front," "rear," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the systems, methods, and/or articles of manufacture described herein are, for example, capable of operation in other orientations than those illustrated or otherwise described herein.

DETAILED DESCRIPTION OF EXEMPLARY EMBODIMENTS

The present disclosure relates to systems, methods, apparatuses, and computer program products for dynamically processing incentives based on channel events. For example, channel events can originate from, or be associated with, a given channel, such as a geographic area. The channel events can be used to dynamically determine or predict channel analysis data. The channel analysis data can be generated by a real-time engine and/or a predictive engine and can be based on the channel events. For example, the channel analysis data can include demand information within the channel. In many embodiments, user behavior data of users can be tracked. Each of these users can be an individual using a mobile device within a channel. The user behavior data can be stored in a user profile for each user. Incentives can be generated to change user behavior of the users, in light of the demand surge. The incentives can be based on incentive metrics, which can track how users respond to incentives.

In some embodiments, a demand adjustment function can be executed to provide the incentives to the users. The behavior of the users after receiving the incentives can be tracked, and this behavior can be used to update the incentive metrics, which provides a feedback loop. The incentives can incentivize the users to delay using the products or services (e.g., riding sharing, hotel accommodations, parking garages, dining availability, sporting or event tickets, etc.) having the current demand surge, or incentivize the users to use other products or services while the demand surge exists. These incentives can change user behavior to facilitate adjusting the demand for the products or services with the demand surge. Such changes in user behavior can help to "flatten" the surge and/or to incentivize users to use other products or services, such in other verticals, while there is a demand surge. In certain embodiments, a user-sourced analytics platform can be used to incorporate the channel events, incorporate the user behavior data, incorporate the incentive metrics, detect a demand surge, and generate the incentives for the users.

The channel events can generally include any data relating to individuals located within a channel, activities occurring within the channel, and/or other conditions associated with the channel. For example, in some embodiments, the channel events for the channel can include data indicating locations or movements of individuals (or mobile devices operated by individuals) within the channel. The channel events also can include data relating to transactions conducted within the channel, weather conditions within the channel, merchants located within the channel, and events (e.g., concerts, conventions, sporting games, etc.) occurring with the channel. The channel events can include user-sourced data, such as data entered by users who are using a mobile device within the channel. Such mobile devices can provide an application that allow the users to enter the user-sourced data. For example, an application provided by a client system can be used by the users to enter user-sourced data. The channel events also can include other data, such as location data associated with the mobile devices of the users with the channel. The location data and the user-sourced data can be correlated to associate the users with location information. The channel events can include many additional attributes related to the channel itself and/or users within the channel. Further examples of channel events are described throughout this disclosure.

In some embodiments, the location data can include information about the location of mobile devices within the channel, information about the establishments (e.g., restaurants, retailers, hotels, etc.) within the channel, vertical categorizations (e.g., residential, hotel, healthcare, retail, etc.) of the establishments within the channel, one or more rankings of individuals within the channel based on their use of establishments or verticals within the channel, other suitable location data, or suitable combinations thereof.

The user-sourced data can include various different types of data that can be entered by a user of a mobile device. For example, a user can enter demographic data, psychographic data, user-preference data, user-transaction data, user-feedback data, such as reasons for actions taken or not taken by the user, and/or other suitable types of user-sourced data. The user-sourced data can be input in some cases using sliders, such as single- or multi-dimensional sliders, which can allow users to input preferences on a sliding scale. In a number of embodiments, the user-sourced data can be used to generate or further build out user profiles for the users.

The users can be incentivized to provide the user-sourced data by being offered incentives for providing the data. For example, the incentives can include offers for reward points, cryptocurrency, a coupon, a discount on a good or service, or a free offer for a good or service. In many cases, the incentives can be offered in exchange for the user taking or agreeing to take a desired course of action (e.g., a discount to a restaurant that can be used by the user within a certain time window). In other cases, the incentives can be offered without the user agreeing to a course of action, but which can still incentivize certain user behavior, such as building goodwill and fostering continued loyalty of the user to an establishment or merchant.

The channel analysis function can be configured to analyze or process the channel events, and generate channel analysis data for the channel. The channel analysis data generated can vary. The channel analysis data for the channel can include various metrics relating to the channel itself, individuals within the channel, and/or activities occurring within the channel. For example, the channel analysis data can indicate or predict the supply and/or demand within the channel for one or more products or services (e.g., riding sharing, hotel accommodations, parking garages, dining availability, sporting or event tickets, etc.). The channel analysis data also can identify or predict increases and/or decreases in the number of individuals within the channel, as well as intra-channel and inter-channel movements of those individuals. The channel analysis data can include many other metrics related to the channel, individuals in the channel, and/or activities occurring within the channel. Further examples of channel analysis data are described throughout this disclosure.

The channel analysis data generated can include real-time analysis information that provides current or up-to-date data relating to the aforementioned metrics and/or other metrics. The channel analysis data can be generated based on the channel events, including the user-sourced data. The channel analysis data also can include predictive analysis information that predicts a future status of the aforementioned metrics and/or other metrics. Examples of these real-time and predictive analytics are provided throughout this disclosure.

In some embodiments, the channel analysis data can be used to execute one or more demand adjustment functions. Additionally, or alternatively, the channel analysis data can be provided to one or more client systems that utilize the channel analysis data to execute the one or more demand adjustment functions. One exemplary demand adjustment function can include a pricing function that determines prices for one or more inventory items. For example, in some cases, the channel analysis data can be utilized by a surge pricing function to dynamically adjust prices for one or more inventory items in a manner that accounts for the supply and demand for the one or more inventory items. Another exemplary demand adjustment function includes an inventory management function that utilizes the channel analysis data to manage or adjust inventories (e.g., such as to dynamically reallocate inventory items among channels and/or initiate ordering of additional inventory items). Yet another exemplary demand adjustment function includes an incentive management function that provides one or more incentives to one or more users (e.g., to dynamically incentivize different behavior by the users in the face of the demand surge). In many embodiments, the demand adjustment function can factor in the channel analysis data that takes into account user-sourced data, such as preferences of the users in the channel.

The demand adjustment function that provides incentives can be based on incentives generated for one or more users based on the demand surge, the channel analysis data, the user behavior data, and/or incentive metrics. The incentive metrics can be stored by the user-sourced analytics platform and can include information about the performance of various incentives on user behavior in various situations. For example, when there is a surge in demand for a ride-sharing service, such as after a sporting event ends, an incentive comprising a discount to a restaurant a quarter-mile away can be offered to various users in the channel to incentivize those users to go to the restaurant instead of paying surge pricing for the ride-sharing service. The response of the users to such incentive can be tracked for each individual user as tracked user behavior, and/or can be tracked collectively across the users, as incentive metrics.

When user behavior in various situations is known, and/or when incentive metrics are known, incentives can be generated based at least part on this information to incentivize different user behavior. In many embodiments, the incentives can be specific, measurable, achievable, realistic, and/or timely. For example, the incentives can offer a benefit to users in during the current demand surge in the area that the users are at, so that the incentive can be reasonably used. Tracking the response of a user to an incentive can be achieved in various different ways. For example, if a discount is offered through the location application to the user, the discount can be redeemed through the location application, and the location application can provide information about the user redeeming the discount.

The incentives can incentivize a users to change their behaviors in various different ways. For example, the incentives can incentivize users to use other verticals in addition to a desired vertical (e.g., go to a restaurant while waiting for the surge to drop for a ride-sharing service), to continue to use the same establishment or vertical (e.g., an incentive to wait and use the same desired service after the surge ends or decreases), to use a service more frequently than the user in known to currently use the service, to retain the user using a commonly used service in the face of higher pricing (e.g., surge pricing) and/or increased competition, etc.

The channel analysis data can be utilized to execute one or more deployment functions that enable the channel analysis data to be utilized for a variety of purposes. In some scenarios, a deployment function can be executed to automate pricing systems (e.g., surge pricing systems), inventory systems, or incentive systems, based on the channel analysis data. For example, the channel analysis data can be interfaced with pricing, inventory, and/or incentive applications operated by one or more client systems (e.g., third-party systems) to automatically adjust the pricing of inventory (e.g., products or services), automatically reallocate or reorder inventory, and/or provide incentives to users, based on the supply and demand metrics associated with the channel and/or based on the increases or decreases of individuals within the channel.

In another example, a deployment function can be executed to transmit notifications that include some or all of the channel analysis data. For example, notifications can be transmitted to client systems affiliated with merchants within the channel to disseminate real-time data and/or predictive data relating to the supply and demand of particular products or services. The merchant notifications also can include other information included in the channel analysis data (e.g., population surge information, event information, transaction patterns within the channel, movement patterns of individuals with the channel, etc.). Notifications also can be transmitted to individuals within the channel (e.g., to present incentives, such as offers or discounts, to the individuals and/or recommend merchants located in the channel). Additional types of deployment functions are described throughout this disclosure.

The technologies described herein can provide a variety of benefits and advantages. Amongst other things, the use of user-soured data and predictive technologies can predict conditions in the channels with greater accuracy and precision, including conditions pertaining to the demand with the channel, at various establishments within the channel, or across various verticals in the channel. For example, in some instances, the prediction model can consider the demographics, psychographics, preferences, feedback, etc. of users to determine individualized inclinations or propensities of users within a given channel, and/or predict inclinations or propensities of other individuals within the channel, to compute real-time demand predictions for a given channel. The increased accuracy and precision of these demand predictions can be attributed, at least in part, to the granular, individualized predictions generated for each of the these individuals, which leverages user-sourced data from users of mobile devices within the channel. By incentivizing users to provide such user-sourced data, the quantity and quality of such data can be increased.

Further benefits can be attributed to the usefulness and versatility of the channel analysis data, which can be leveraged for many different purposes. For example, in some scenarios, the demand predictions can be utilized by client systems to automate pricing functions, inventory functions, and/or incentive functions in real-time or near real-time based on the current conditions within the channels. Additionally, the demand predictions can be utilized by client systems to prepare for predicted future conditions within the channels. In some cases, the client systems can be interfaced with a user-sourced analytics platform (e.g., via an application programming interface or API) to enable immediate access to the demand predictions on a continuous basis, thereby facilitating a seamless adjustment of pricing or inventory allocations, and/or providing of incentives, in real-time or near real-time. This data can provide merchant entities with real-time and/or predictive metrics that can assist merchant entities with accommodating surges in supply and demand in the same or other verticals (and/or population surges within a channel). By making a merchant in one vertical aware of a demand surge in a different vertical, the merchant can make decisions that can capitalize on that surge in the different vertical, such as by providing incentives to users within the channel and/or surge area to use the merchant during the demand surge and avoid paying surge pricing in the different vertical. The user-sourced analytics platform thus can provide a dynamic incentive response system.

Additional benefits can be attributed to embodiments that utilize the demand predictions to automate surge pricing functions. Client applications that employ surge pricing functionalities can better mitigate imbalances between an available supply of inventory items and a demand for those inventory items. The demand predictions and incentives can be leveraged to dynamically adjust prices for the inventory items and/or offer incentives (e.g., offering reward points for delayed use), thereby enabling providers of the client applications to reduce high-demand peaks.

Other benefits can be attributed to the versatility of the technologies described herein, which can be leveraged to improve operations in any establishment or in any vertical. That is, the location tracking and predictive technologies can be applied to predict current and/or future supply and demand conditions for any establishment or vertical. Exemplary verticals that can benefit from these technologies can include those related to ride hailing services, transportation (e.g., ticket bookings for buses, trains, airplanes, cruises, boats, etc.), lodging accommodations (e.g., affiliated with hotels, motels, short-term home stays, rental services, property purchases, etc.), parking services (e.g., affiliated with parking garages, parking lots, etc.), restaurant services, tavern services, entertainment services, etc. For example, the technologies disclosed herein can provide vertical-specific or merchant-specific insights and metrics regarding the current and future demand for products and services offered in these verticals or by these entities. These metrics can be used by those entities to automatically or manually adjust settings for pricing systems (e.g., surge pricing systems), inventory systems, incentive systems, and/or other operations. By using user-sourced information from users in the channel, tracking and storing user behavior, tracking incentive metrics, and/or extrapolating information more generally about other individuals in the channel based on the user-sourced information, the insights and metrics provided to specific merchants and/or in specific verticals can be more accurate.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature and/or component referenced in this disclosure can be implemented in hardware and/or software.

Figure 1B:
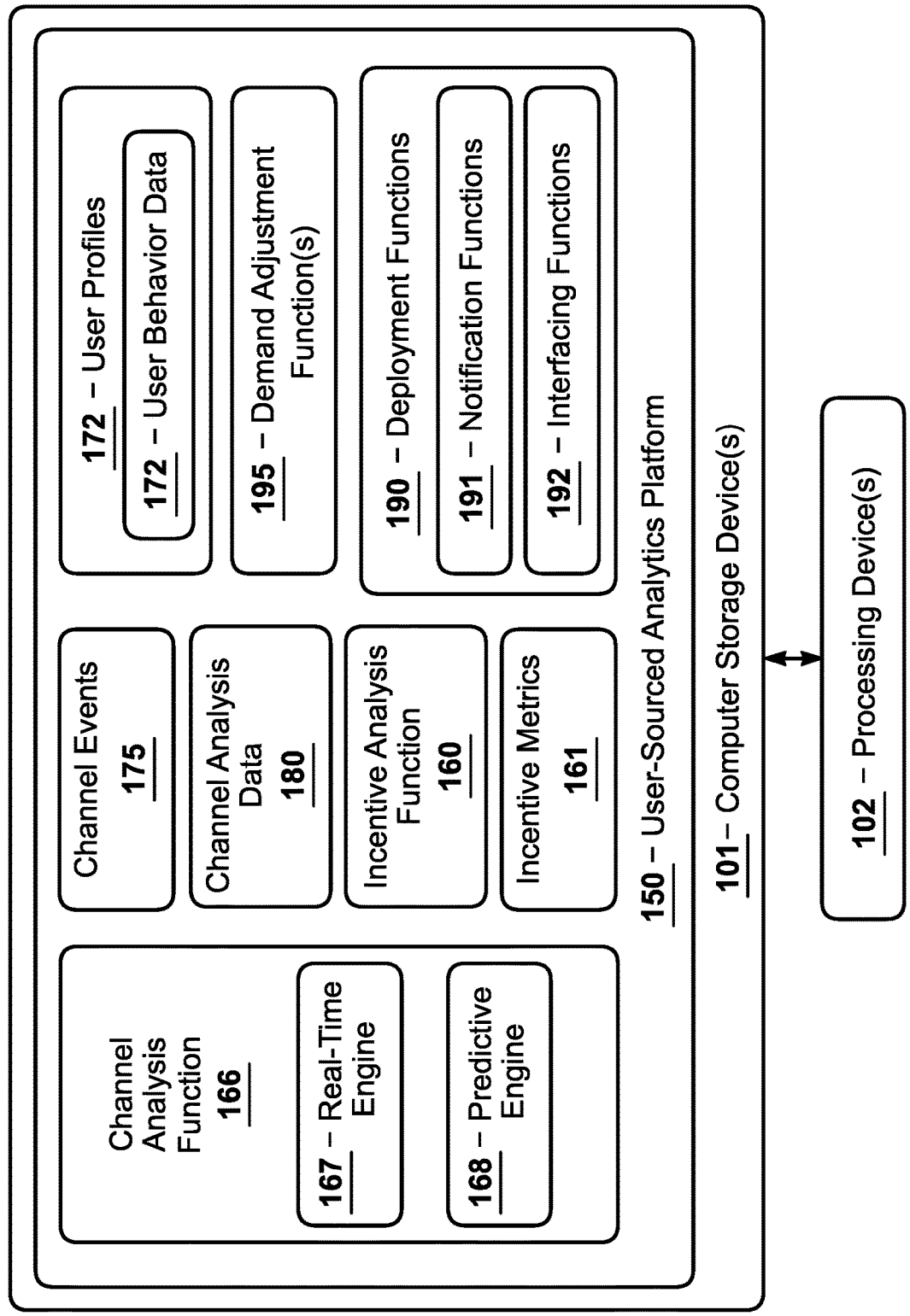
FIG. 1B is a block diagram illustrating exemplary features of a user-sourced analytics platform according to certain embodiments.

FIG. 1A is a diagram of an exemplary system 100 in accordance with certain embodiments. The system 100 includes, inter alia, a user-sourced analytics platform 150 that generates or derives channel analysis data 180 for a channel 170. FIG. 1B is a diagram illustrating additional features, components, and/or functions associated with the user-sourced analytics platform 150. FIGS. 1A and 1B are jointly discussed below.

The system 100 comprises one or more computing devices 110, one or more servers 120, one or more external data sources 130, and one or more client systems 140 that are in communication over a network 105. User-sourced analytics platform 150 is stored on, and executed by, the one or more servers 120. The network 105 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1A, including the one or more computing devices 110, one or more servers 120, one or more external data sources 130, and one or more client systems 140, and user-sourced analytics platform 150 can be configured to communicate directly with each other and/or over the network 105 via wired or wireless communication links, or a combination of the two. Each of the computing devices 110, servers 120, external data sources 130, client systems 140, and user-sourced analytics platform 150 can include one or more communication devices, one or more computer storage devices 101, and one or more processing devices 102 (FIG. 1B) that are capable of executing computer program instructions.

The one or more computer storage devices 101 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more computing storage devices 101 may be physical, non-transitory mediums. The one or more computer storage devices 101 can store, inter alia, instructions associated the implementing the functionalities of the user-sourced analytics platform 150 described herein.

The one or more processing devices 102 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 102 can be configured to execute any computer program instructions that are stored or included on the one or more computer storage devices 101 including, but not limited to, instructions associated the implementing the functionalities of the user-sourced analytics platform 150 described throughout this disclosure.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable some or all of the computing devices 110, servers 120, external data sources 130, client systems 140, and/or user-sourced analytics platform 150 to be connected to the Internet and/or other network. The modem devices can permit bi-directional communication between the Internet (and/or other network) and the computing devices 110, servers 120, external data sources 130, client systems 140, and/or user-sourced analytics platform 150. In certain embodiments, one or more router devices and/or access points may enable the computing devices 110, servers 120, external data sources 130, client systems 140, and/or user-sourced analytics platform 150 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 110, servers 120, external data sources 130, client systems 140, and/or user-sourced analytics platform 150 to access the Internet and/or other networks.

In certain embodiments, the computing devices 110 may represent desktop computers, laptop computers, mobile devices (e.g., smart phones, personal digital assistants, tablet devices, vehicular computing devices, wearable devices, or any other device that is mobile in nature), and/or other types of devices. The one or more servers 120 may generally represent any type of computing device, including any of the aforementioned computing devices 110. The one or more servers 120 also can comprise one or more mainframe computing devices and/or one or more virtual servers that are executed in a cloud-computing environment. In some embodiments, the one or more servers 120 can be configured to execute web servers and can communicate with the computing devices 110, external data sources 130, client systems 140, and/or other devices over the network 105 (e.g., over the Internet).

In certain embodiments, the user-sourced analytics platform 150 can be stored on, and executed by, the one or more servers 120. Additionally, or alternatively, the user-sourced analytics platform 150 can be stored on, and executed by, the one or more computing devices 110 and/or one or more client systems 140. The user-sourced analytics platform 150 can be stored on, and executed, by other devices as well.

In some embodiments, the user-sourced analytics platform 150 also can be stored as a local application 111 on a computing device 110, or interface with the local application 111 stored on a computing device 110, to implement the techniques and functions described herein. The computing device 110 may be part of client system 140 in some scenarios. In many embodiments, local application 111 can be provided by a client system 140 or an entity associated with client system 140.

The client systems 140 can generally correspond to third-party systems, networks, and/or devices that access the user-sourced analytics platform 150 and/or utilize the data (including the channel analysis data 180) generated by the user-sourced analytics platform 150. For example, the client systems 140 can be operated and managed by platform users, such as individuals, businesses, and/or other entities, which can utilize the user-sourced analytics platform 150 (including the channel analysis data 180 generated by the user-sourced analytics platform 150) to improve the functionalities of one or more systems and/or one or more applications.

In certain embodiments, each of the client systems 140 can register and/or create a platform user account with the user-sourced analytics platform 150 to obtain access to the data and services provided by the user-sourced analytics platform 150. The client systems 140 can be operated by, or associated with, individuals or businesses from any industry or vertical including, but not limited to, those that offer ride hailing services, hotel or lodging accommodations, parking space availability, tavern services, and restaurant services. As explained in further detail below, the client systems 140 can utilize the channel analysis data 180 (and other data provided by the user-sourced analytics platform 150) to enhance and improve business operations in various ways.

Each of the client systems 140 may include one or more computing devices 110 that enable the client systems 140 to access the user-sourced analytics platform 150 over the network 105. In some cases, one or more of the client systems 140 may include sophisticated technological infrastructures, such those that include enterprise systems, servers 120, virtual private networks (VPNs), intranets, etc. The computing devices 110, servers 120, and/or other devices associated with each client system 140 can store and execute various applications (e.g., such as ride hailing applications, lodging booking applications, dining reservation applications, pricing applications, inventory management applications, etc.). The client systems 140 and associated applications can leverage the data (e.g., channel analysis data 180) provided by the user-sourced analytics platform 150 in various ways.

In certain embodiments, the user-sourced analytics platform 150 can be integrated with (or can communicate with) various applications hosted by the client systems 140 including, but not limited to, applications that provide products or services for transportation services (e.g., ride hailing services, ride sharing services, vehicle rental services, and/or ticket scheduling services for buses, trains, planes, boats, and/or other modes of transportation), lodging accommodations (e.g., booking services for hotels, motels, short-term home stays, rental services, property purchases, etc.), parking space services (e.g., booking services for parking garages, parking lots, etc.), and scheduling services (e.g., reservation services for restaurants, bars, sporting events, concerts, ticketed events, etc.). In certain embodiments, the user-sourced analytics platform 150 additionally, or alternatively, can be integrated with (or can communicate with) e-commerce applications, pricing applications, inventory management applications, and/or other applications.

The aforementioned applications and/or other applications, each of which may be integrated or interfaced with the user-sourced analytics platform 150, can be stored on one or more client systems 140 in some embodiments. For example, the aforementioned applications and/or other applications can be stored on one or more computing device 110 and/or one or more servers 120 associated with one or more client systems 140.

As discussed throughout this disclosure, the user-sourced analytics platform 150 can generally provide functions associated with analyzing conditions associated with activities, individuals, events, and/or like within each of a plurality of channels 170. This analysis can be used to generate channel analysis data 180 corresponding to each of the channels 170. The channel analysis data 180 for a given channel 170 can include various metrics and information useful for understanding and/or predicting the conditions within the channel 170. For example, the channel analysis data 180 for the channel 170 can include information that indicates and/or predicts population surges within the channel 170, movements of individuals within the channel, and/or supply and demand for inventory (e.g., products or services) within the channel 170. Additionally, as described in further detail below, the user-sourced analytics platform 150 can utilize the channel analysis data 180 to implement a surge pricing function, inventory management function, and/or incentive function on a variety of client applications.

Each channel 170 can represent, or correspond to, a specific geographic region or area. The scope or region associated with each channel 170 can vary significantly. For example, macro-level channels 170 can correspond to large geographic areas covering entire continents, countries, and/or states. Other more micro-level channels 170 can correspond to counties, cities, and/or towns. Additional channels 170 can correspond to specific regions, neighborhoods, areas, or the like within cities or towns. Regardless of geographic scope, server 120 can be associated with a channel 170 to process data associated with the channel 170 and generate channel analysis data 180 for the channel 170.

In many embodiments, the computing devices 110 (e.g., mobile devices, smart phones, wearable devices, etc.) can be operated by users within the channels 170. Each of the computing devices 110 can store and execute a location application 111. These users can use the local application 111, which can be a mobile application, a web-based application, or another suitable application running on computing device 110. The local application 111 can be associated with, and/or provided by, the entity associated with client system 140. For example, a merchant or hospitality provider can provide a mobile application or a web-based application to users, such as a shopping app or loyalty app. In other embodiments, the local application 111 can be associated with, and/or provided by, an entity that operates the user-sourced analytics platform 150. In some cases, the local application 111 can be a plug-in associated with, and/or provided by, an entity that operates the user-sourced analytics platform 150 and that works with another application associated with, and/or provided by, the entity associated with client system 140 that is running on computer device 110 of the user. In many embodiments, the local application 111 can provide a way for the user-sourced analytics platform 150 to obtain direct information from users. In several embodiments, the location application can be used by user-sourced analytics platform 150 and/or client system 140 to provide incentives to users, such as displaying offers that can be accepted, redeemed, or obtained by accepting the offer, the user making a change in user behavior, and/or by entering information within location application 111.

The user-sourced analytics platform 150 can include a user app interface 171, which can be used to interface or communicate with local application 111, obtain user-sourced data from local application 111, and/or provide incentives to the users through location application 111. For example, the user app interface 171 can be a web server, application server, or a function that provides similar functionality. In some examples, the user-sourced analytics platform 150 can obtain the user-sourced data via the client system 140 obtaining the user-sourced data from local application 111, and the client system 140 providing the user-sourced data to the user-sourced analytics platform 150 through user app interface 171. In other examples, the user app interface 171 of the user-sourced analytics platform 150 can obtain the user-sourced data directly without passing through client system 140. In some cases, the client system 140 can filter, edit, summarize, redact, or otherwise alter the amounts, the types, the content, or other aspects of the user-source data that is provided to the user app interface 171 via client system 140. For example, some user-sourced data can be sensitive proprietary information that the client system 140 does not share with the user-sourced analytics platform 150, and such information can be filtered out, summarized, edited, or otherwise handled to prevent certain information from being shared from the client system 140 to the user-sourced analytics platform 150. The user-sourced data is one of the types of channel events 175, and the user-sourced data is further described below in association with user-sourced data 503. Incentives can be provided to the users through location application 111 to incentivize the users to enter such user-sourced data in the location application 111.

The types and content of the channel events 175 received and processed can vary. The channel events 175 can generally include any data associated with monitoring locations of individuals (including the users and others) within the channel 170, activities occurring within the channel 170, and/or other conditions associated with the channel 170. For example, the channel events 175 can include data indicating locations of individuals (or their smart phones or mobile devices) within the channel 170, transactions conducted within the channel 170, weather conditions within the channel, and/or events (e.g., concerts, conventions, etc.) occurring within the channel 170.

The channel events 175 can be generated by, or received from, various devices, systems, and/or sources. Some of the channel events 175 can be generated by computing devices 110 (e.g., mobile devices, smart phones, wearable devices, etc.) operated by individuals within the channels 170, such as the user-sourced data from users using the local application 111 on computing device 110. For example, these devices (or applications installed thereon) can generate channel events 175 indicating locations of the devices, transactions conducted using the devices, and/or other information.

Additional channel events 175 can be received one or more external data sources 130, which can include third-party websites, databases, and/or servers that provide information relating to the channels 170 and/or individuals located within the channels 170. Exemplary external data sources 130 can include websites, databases, and/or servers associated with cellular device providers, weather outlets, news outlets, social media sites, and/or the like. In some embodiments, these and other external data sources 130 be used to derive or generate channel events 175 relating to weather conditions within the channels 170, events occurring with the channel, locations of individuals within the channels, etc.

In many embodiments, the channel events 175 can include various types of location data. For example, the location data can include data indicating locations or movements of individuals (or mobile devices operated by individuals), such as the users or others, within the channel. The location data also can include data relating to establishments (e.g., merchants, restaurants, retailers, hotels, etc.) within the channel. The location data additionally can include vertical categorizations (e.g., residential, hotel, healthcare, retail, etc.) of the establishments within the channel. The location data further can include one or more rankings of individuals within the channel based on their use of establishments or verticals within the channel.

The user-sourced analytics platform 150 can correlate the location data and the user-sourced data to associate particular users with location information. For example, the location information can indicate that a particular device has been used regularly at certain locations, at certain establishments, or at certain verticals, and this information can be associated with a particular user. When combined with user-sourced data for the user, the user-sourced analytics platform can provide invaluable feedback and insights about users and actions within the channel 170.

The user-sourced analytics platform 150 can use the user-sourced data to generate or store additional information to user profiles 172 about the users. For example, the user-sourced analytics platform 150 can create or store a user profile 172 for each user for which user-sourced data is obtained. The user profiles 172 can store information about the user, such as demographic information about the user, psychographic information about the user, preferences of the user, transactions made by the user, feedback provided by the user, and/or other suitable information. In many cases, the user profiles can include location information that has been correlated to the user, which can provide information about locations and movements of the user in the channel, use of establishments or verticals by the user, and/or other suitable information. In some cases, the user-sourced analytics platform 150 can aggregate, summarize, or otherwise synthesize user-sourced data about a user and store such data to the user profile for the user. For example, if a user shows a preference for luxury vehicles across multiple transactions, the user profile can include information about this user preference. Additionally, or alternatively, if the user provides user-sourced data through the local application 111 expressly indicating that the user prefers luxury vehicles, that information can be stored in the user profile. The preferences of a user in the user profile can be updated as additional information is obtained about the user, such as different preference information obtained through the user-sourced data or through different transaction patterns recognized for the user. As described herein, the user can be incentivized to provide at least some of such information.

The user profiles 172 also can include user behavior data 173 for each user. The user behavior data 173 can include at least some of the information described above (e.g., channel events 175, the user-sourced data, etc.), and can include information about how the user has responded to specific situations and/or a synthesis of how the user generally responds in certain situations. The user behavior data 173 can be tracked in user-sourced analytics platform based on the user-sourced data, the channel events 175, and/or other suitable sources. For example, the user behavior data 173 can show that a user regularly attends a basketball game and uses a ride-sharing service after the basketball game during surge demand to go to restaurants miles away and outside the surge area. Such user behavior data can be used by user-sourced analytics platform 150 in such situations to generate an incentive for the user to go to a restaurant within walking distance of the basketball arena.

Figure 5B:
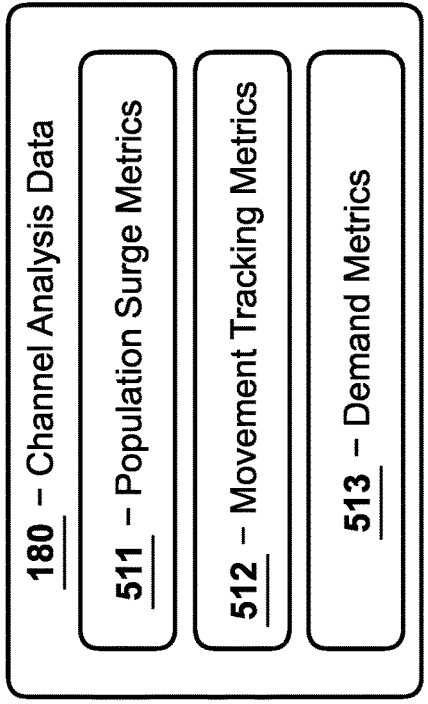
FIG. 5B is a block diagram illustrating exemplary channel analysis data, according to certain embodiments.
Figure 5C:
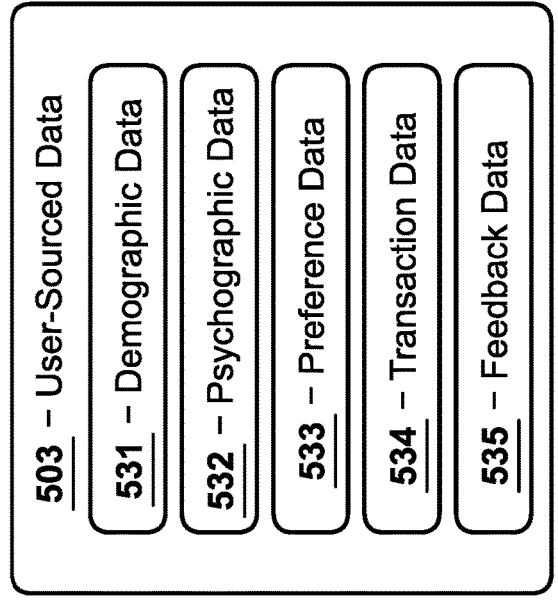
FIG. 5C is a block diagram illustrating examples of user-sourced data, according to certain embodiments.
Figure 5A:
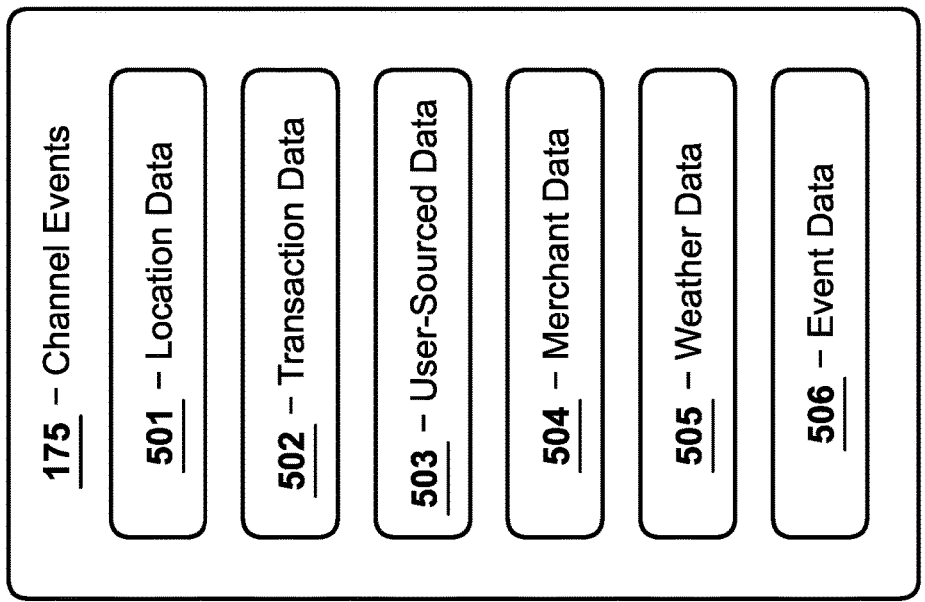
FIG. 5A is a block diagram illustrating examples of channel events, according to certain embodiments.

FIG. 5A is a block diagram illustrating examples of channel events 175 that can be received by the user-sourced analytics platform 150. As shown, the channel events 175 can include, inter alia, location data 501, transaction data 502, user-sourced data 503, merchant data 504, weather data 505, and event data 506.

The location data 501 can indicate the current locations and/or historical locations and movements of individuals (or computing devices 110 operated by individuals), such as the users of local application 111 or other individuals, located in the channel 170. For example, the location data 501 may include GPS coordinates indicating the current locations of individuals, and previous locations of those individuals. In some embodiments, the location data 501 can be received directly from computing devices 110 operated by the individuals (e.g., users) and/or an external data source 130, such as a cellular service provider.

The transaction data 502 can indicate purchases that are made within the channel 170 and/or purchases made by individuals that are currently located within the channel 170. The transaction data 502 also may indicate transaction patterns or profiles for each of the individuals located in the channel 170 (e.g., indicating the types of products or services routinely purchased by the individual and/or the types of businesses routinely frequented by the individual). In some cases, the transaction data 502 also may indicate the channel 170 where each transaction was conducted. In some embodiments, the transaction data 502 can be received directly from computing devices 110 operated by the individuals and/or an external data source 130, such as a third-party merchant system, credit card service provider, digital payments provider, etc.

The user-sourced data 503 received can include information provided by the users of computing devices 110 using the local application 111. Some or all of this information can be stored in the user profiles 172. FIG. 5C, described below, shows some examples of user-sourced data 503 that can be received by the user-sourced analytics platform 150.

The merchant data 504 can provide information related to merchants (e.g., businesses, vendors, etc.) or establishments located in the channel 170. For example, the merchant data 504 may identify the locations of the merchants, the vertical associated with the merchants, hours of operation, and products or services offered by the merchants. In some embodiments, the merchant data 504 can be received directly from computing devices 110 operated by the merchants and/or an external data source 130, such as a crowd-sourced business review applications, business information databases, etc.

The weather data 505 can indicate the current weather conditions and/or historical weather conditions in the channel 170. The weather data 505 also may indicate forecasts of future weather conditions for the channel 170. In some embodiments, the weather data 505 can be received from one or more external data sources 130, such as those that provide weather forecasting services.

The event data 506 can provide information associated with events (e.g., concerts, conventions, seminars, shows, etc.) in the channel 170. The event data 506 can include information identifying ongoing events, as well as previously held or upcoming events. The event data 506 may include dates and times associated with each of the events. In some embodiments, the event data 506 can be received directly from computing devices 110 operated by event providers and/or an external data source 130, such as a social media sites, community bulletin board sites, etc.

The categories identified in FIG. 5A are intended to provide examples of content that may be included in channel events 175. However, it should be recognized that the channel events 175 can include additional information or data related to the activities, individuals, entities, and/or conditions of the channel 170.

FIG. 5C is a block diagram illustrating examples of user-sourced data 503 that can be received by the user-sourced analytics platform 150. As shown, the user-sourced data 503 can include, inter alia, demographics data 531, psychographic data 532, preference data 533, transaction data 534, and feedback data 535.

In some embodiments, the user-sourced data 503 can be received from computing devices 110 operated by the users. For example, the local application 111 running on computing devices 110 can ask the user questions, or prompt the user to fill out a form in the local application 111. In some cases, the local application 111 can present options for the user to select to provide the information, such as types of genders, or income brackets. In some cases, the local application 111 can present one or more sliders, which can be used by the user to enter user-sourced data 503, such as preference data 533, as described below in further detail. In some cases, the user can offered an incentive, such as receiving a reward, such as loyalty points or a store credit, for providing the user-sourced data 503. The local application 111 can send the user-sourced data 503 to user-sourced analytics platform 150 through user app interface 171, which in some cases can be via client systems 140.

The demographic data 531 for each user can indicate some or all of the following: age, sex, gender, race, ethnicity, income, marital status, housing status, home address or location, employment status, occupation, education level, income level, etc.

The psychographic data 532 for each user can indicate some or all of the following: interests, values, attitudes, interests, lifestyles, behaviors, opinions, beliefs, activities, etc.

The preference data 533 for each user can indicate various different preferences of the user. For example, a user may generally prefer luxury vehicles over economy vehicles when placing an order with a ride hailing service, and may be willing to pay for such luxury vehicles up to a certain point. As another example, a user may prefer to pay with points (e.g., rewards points) and prefer to see prices in points instead of the local currency. As a further example, a user may prefer electric vehicles or vehicles with a lower environmental impact. As yet another example, a user may be willing to share a ride with other users.

Figure 2:
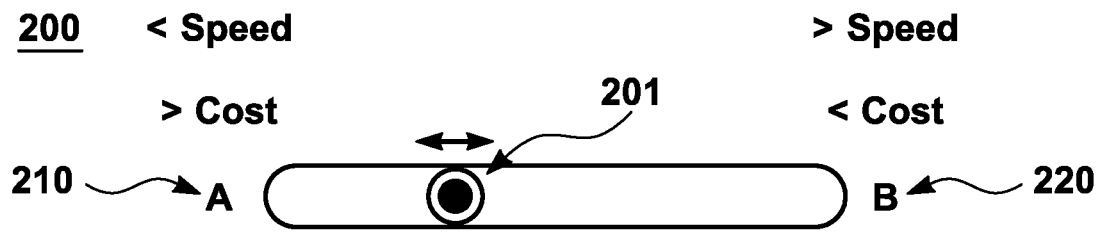
FIG. 2 is a portion of a display screen showing a single-dimensional slider.
Figure 3:
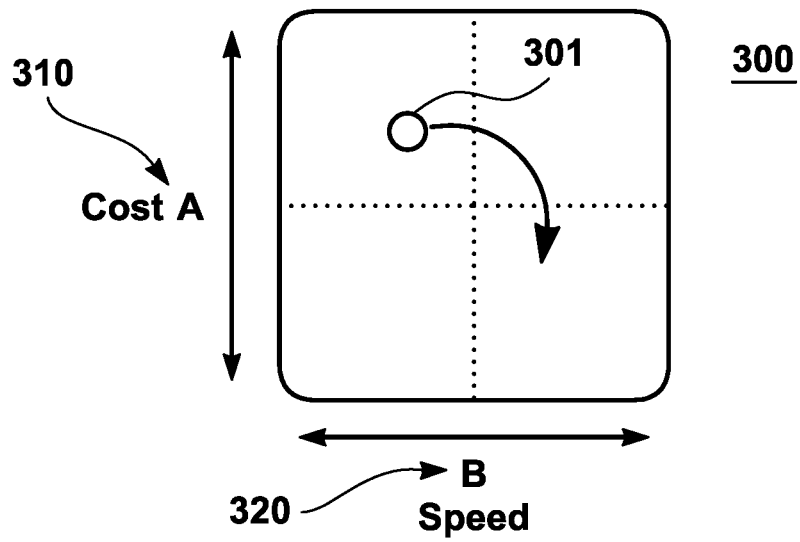
FIG. 3 shows a portion of a display screen showing a two-dimensional slider.
Figure 4:
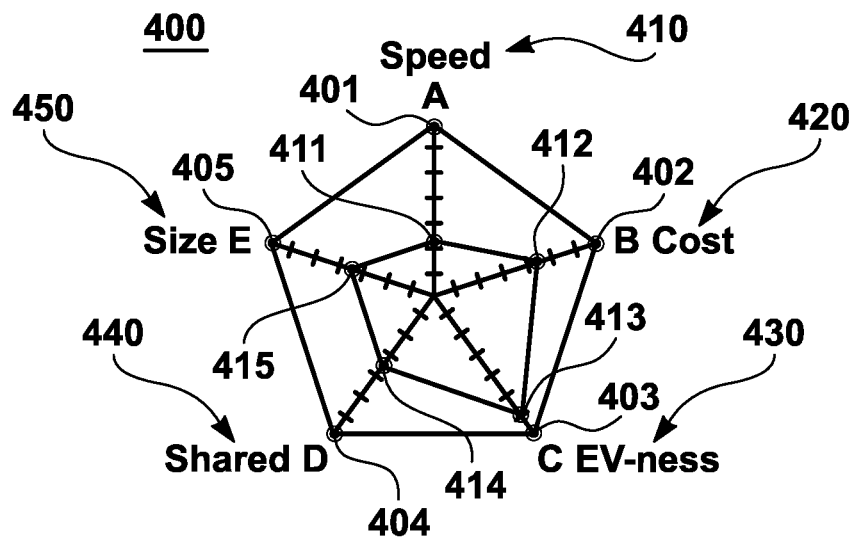
FIG. 4 shows a portion of a display screen showing a multi-dimensional slider.

In many cases, the local application 111 can present one or more sliders, which can be used by the user to enter user-sourced data 503, such as the preference data 533. Examples of sliders are shown in FIGS. 2-4. For example, FIG. 2 shows a portion of a display screen that can be provided by the local application 111. The display screen in FIG. 2 shows a single-dimensional slider 200, which allows a sliding element 201 to be manipulated between a first end associated with a first label 210 and a second end associated with a second label 220. For example, as shown in FIG. 2, the first label 210 can be "<speed" or "slower", and the second label 220 can be ">speed" or "faster". As part of the same example, as shown in FIG. 2, or as a separate example, the first label 210 can be ">cost" or "more cost-conscious", and the second label 220 can be "<cost" or "less cost-conscious". The user can slide sliding element 201 along a continuum between the two ends to indicate how strongly the user prefers speed, even in the face of increased cost, or prefer lower cost, despite longer waits.

FIG. 3 shows a portion of a display screen that can be provided by the local application 111. The display screen in FIG. 3 shows a two-dimensional slider 300, which allows a sliding element 301 to be manipulated within a two-dimensional grid associated with a first axis associated with a first label 310 and second axis associated with a second label 320. For example, as shown in FIG. 3, the first label 310 can be "cost", and the second label 320 can be "speed". The user can move slider element 301 within the grid of two-dimensional slider 300 to indicate how strongly the user cares about cost, and how strongly the user cares about speed. Because cost and speed are merely two factors involved, if the user select a strong preference for low cost and a strong preference for high speed, the user may end up taking a trade-off in other areas, such as quality (an economy vehicle instead of a luxury vehicle).

FIG. 4 shows a portion of a display screen that can be provided by the local application 111. The display screen in FIG. 4 shows a multi-dimensional slider 400, which allows five sliding elements 411-415 to be slid along five different sliding scales between a center 406 and ends 401-405, respectively, which are associated with labels 410, 420, 430, 440, and 450, respectively. For example, as shown in FIG. 4, the first label 410 can be "speed" (indicating preference for speed), the second label 420 can be "cost" (indicating cost-consciousness), the third label 430 can be "EV-ness" (indicating preference for electric vehicles (EVs)), the fourth label 440 can be "shared" (indicating preference or willingness to have a shared accommodation), and the fifth label 450 can be "size" (indicating preference for size). The user can move each of slider elements 411-415 within the sliding scales between the center 406 and ends 401-405, respectively, to indicate how strongly the user cares about the particular area of preference.

Returning to FIG. 5C, the transaction data 534 for each user can include information about purchases or other transactions made by the user. For example, the transaction data 534 can include information about purchases made by the user through the local application 111, and are known to the local application 111 on that basis. Additionally or alternatively, the transaction data 534 can include information provided by users through the local application 111 about purchases the user has made, such as purchases made outside the local application 111. The transaction data 534 also may indicate transaction patterns or profiles for the user (e.g., indicating the types of products or services routinely purchased by the user and/or the types of businesses routinely frequented by the user).

The feedback data 535 for each user can include information entered by the user either as free-form feedback, or in response to prompts for feedback, through the local application 111. For example, the user can be prompted to provide reasons for actions taken or not taken by the user. To illustrate, if a user was presented with an offer at an establishment (e.g., a hotel room for a certain price) through the local application 111, and the user declined the offer, the local application 111 can ask the user to provide reason(s) for not accepting the offer. For example, the local application 111 can present selectable options or check boxes next reasons, such as "too expensive", "not enough options", "not relevant", etc. As another example, the local application 111 can ask the user what would have made the user accept the offer and close the deal.

The categories identified in FIG. 5C are intended to provide examples of user-sourced data 503. However, it should be recognized that the user-sourced data 503 can include additional information or data provided by the users of computing devices 110 within the channel 170. As described herein, in some cases, the user-sourced data 503 can be obtained from users that might not otherwise provide the user-sourced data 503 by offering incentives as a reward for providing the user-sourced data 503. For example, if a user has been asked by location application 111 to fill out a form about demographic information and user preferences of the user, but the user has not yet to the form, the user can be offered an incentive, such as some cryptocurrency or reward points, if the user fills out the form.

Returning to FIGS. 1A and 1B, the channel events 175 associated with the channel 170 can be received by user-sourced analytics platform 150. The user-sourced analytics platform 150 can execute a channel analysis function 166 to analyze the channel events 175, and generate channel analysis data 180 for the channel 170. The channel analysis data 180 can include various types of metrics or data useful for understanding the conditions associated with the channel 170. In many scenarios, the channel analysis data 180 can include real-time information regarding the current channel conditions and/or predictions related to future channel conditions.

FIG. 5B is a block diagram illustrating examples of channel analysis data 180 that can be generated by the user-sourced analytics platform 150. In some embodiments, the channel analysis function 166 executed by user-sourced analytics platform 150 may generate channel analysis data 180 that includes population surge metrics 511, movement tracking metrics 512, and demand metrics 513.

The population surge metrics 511 generated by user-sourced analytics platform 150 can detect occurrences or situations in which the number of users and/or other individuals located within the channel 170 (or certain regions in the channel 170) significantly increases and/or decreases. In some embodiments, the population surge metrics 511 can include data that identifies densities of users and/or other individuals throughout the channel 170. For example, the population surge metrics 511 can indicate regions within the channel 170 where there is a high density of users and/or other individuals and/or regions within the channel where there are lower densities of users and/or other individuals. In some cases, the population surge metrics 511 for a channel 170 can be generated, at least in part, by monitoring locations (e.g., GPS coordinates) of users' and/or other individuals' computing devices 110 (e.g., smart phones or mobile devices), determining the number of computing devices 110 that are located within the channel 170 (or region within the channel), and comparing that number to a value indicating an average or baseline population for the channel 170 (or region within the channel).

The user-sourced analytics platform 150 also can be configured to predict future channel conditions in which the population in the channel 170 will vary from the average or baseline population. These predictions can be generated based, at least in part, on an analysis of the channel events 175. For example, the event data 506 included in the channel events 175 can be utilized to identify times and locations in which a population surge is likely to occur in the channel 170 (or regions within the channel 170) as the result of an upcoming event (e.g., such as a concert). Additionally, or alternatively, the location data 501 included in the channel events 175 can be used to predict upcoming expansions or retractions of populations within a channel 170 (or regions within a channel 170) based on an analysis of users' and/or other individuals' current locations and/or based on historical movement patterns. Additionally, or alternatively, the weather data 505 included in the channel events 175 also may be utilized to predict the population surge metrics 511 based on expected weather conditions for future time periods. Additionally, or alternatively, the user-sourced data 503 can be used to predict population surge metrics 511, such as by determining users that will likely participate in an upcoming event, or would likely use an establishment after a currently occurring event ends. Such determinations can be based on user-sourced data 503.

The movement tracking metrics 512 can include various metrics indicating and/or predicting the locations or movements of users and/or other individuals within the channel 170. The movement tracking metrics 512 can include data indicating where users and/or other individuals have moved within the channel, and locations where those users and/or other individuals originated. The movement tracking metrics 512 also include data that indicates movement or migration patterns of users and/or other individuals (both intra-channel movement patterns and inter-channel movement patterns). For example, based on an analysis of historical location data 501, the movement tracking metrics 512 may indicate historical movement patterns of users and/or other individuals within the channel 170.

The movement tracking metrics 512 also can include data that predicts the movements of users and/or other individuals throughout a channel 170 in a future time period. For example, the movement tracking metrics 512 can predict regions within a channel where individuals are likely like to migrate. The movement tracking metrics 512 can be generated based, at least in part, on the channel events 175 (e.g., such as the location data 501 indicating current and historical locations of individuals, user-sourced data 503, and event data 506 indicating current or upcoming events within the channel 170).

The demand metrics 513 can include various metrics indicating and/or predicting supply and/or demand within the channel 170 for various inventory items (e.g., products and/or services) at one or more establishments or in one more verticals (e.g., riding sharing, hotel accommodations, parking garages, restaurants, bars, retail, etc.). The current or future supply and/or demand for inventory may be determined based, at least in part, on an analysis of the population surge metrics 511 (e.g., which can indicate or predict the densities of users and/or other individuals within the channel 170 or regions within the channel 170). Additionally, or alternatively, the supply and/or demand for inventory also may be based on an analysis of channel events 175 received by the user-sourced analytics platform, such as channel events that include user-sourced data 503 (e.g., users preferring speed over cost-consciousness), transaction data 502 (e.g., which may indicate recent or historical purchases made within the channel 170), weather data 505 (e.g., which may indicate weather conditions affecting the demand for inventory), merchant data 504 (e.g., which may indicate the supply of inventory in the channel 170), the correlations of the location data and the user-sourced data 503 (e.g., the history of a user utilizing certain establishments or verticals in view of the user's preferences), and/or other channel events 175.

The population surge metrics 511, movement tracking metrics 512, and demand metrics 513 are provided as examples of channel analysis data 180. However, it should be recognized that the channel analysis data 180 can include many other types of metrics or analytics relevant to the conditions of the channels 170.

Returning to FIGS. 1A and 1B, the one or more computing devices 110 can enable individuals to access the user-sourced analytics platform 150 over the network 105 (e.g., over the Internet via a web browser application). For example, after a platform user account is established with the user-sourced analytics platform 150, a platform user (e.g., an individual associated with a client system 140 or other individual) may utilize the user-sourced analytics platform 150 to access to channel analysis data 180 generated by the user-sourced analytics platform 150. In some embodiments, the platform user may be provided with access to the channel analysis data 180 generated across all of the channels 170. In other embodiments, the platform user may designate particular channels 170 of interest and receive channel analysis data 180 from the designated channels 170. In some embodiments, the platform user also may designate particular verticals or industries of interest, and receive channel analysis data 180 pertaining specifically to those verticals or industries. In many embodiments, the platform user can select or enter information about various incentives that can be offered to the users in the channel, the types of behaviors to be incentivized by the users in the channel, and/or which incentives to associated with each of the desired behaviors.

The user-sourced analytics platform 150 may generate various graphical user interfaces (GUIs) that display the channel analysis data 180 and/or other associated data (e.g., channel event information, user profiles 172, account profiles for the platform user, etc.), and these interfaces can be accessed via the platform user accounts. The interfaces provided by the user-sourced analytics platform 150 also can include selectable options for configuring one or more deployment functions 190 and/or incentive arrangements. The deployment functions 190 can permit platform users to leverage the channel analysis data 180 (and other data generated by the user-sourced analytics platform 150) for various purposes.

One exemplary deployment function 190 can include a notification function 191. The notification function 191 enables users to configure the transmission of notifications in various scenarios. The notifications can be transmitted in various ways (e.g., via e-mail, cellular text messages, inbox messages on platform user accounts, data presented on GUIs, etc.) and the notifications can be sent to various devices (e.g., client systems 140, mobile or computing devices operated by individuals located in a channel 170, etc.).

Another exemplary deployment function 190 can include an interfacing function 192. The interfacing function 192 can permit a platform user to interface the user-sourced analytics platform 150 with various external applications and/or systems, thereby enabling those applications and/or systems to receive and utilize the channel analysis data 180 and/or user profiles generated and/or stored by the user-sourced analytics platform 150.

In some embodiments, one or more of applications running on, or operated by, the client systems 140 can be directly interfaced with the user-sourced analytics platform 150 (e.g., via an application programming interface or API provided by the user-sourced analytics platform 150). In some exemplary scenarios, an client system 140 may execute or provide a ride hailing application, a lodging booking application (e.g., hotel booking application), a dining reservation application (e.g., an application for scheduling dining reservations), a ticket booking application (e.g., for purchasing tickets to concerts, sporting games, and/or other events), a pricing application (e.g., an program that computes or determines prices for products and/or services), a staffing application (e.g., a program that schedules employees), and/or an inventory management application (e.g., a program that allocates inventory among different channels 170 or locations, places orders for new inventory, etc.). The interfacing function 192 can connect the user-sourced analytics system 150 to these applications (and other types of applications), thereby enabling the applications to directly receive the channel analysis data 180 and utilize the channel analysis data 180 to automate control of one or more functions (e.g., such as determining or adjusting pricing information, adjusting inventory allocations, initiating purchases of additional inventory, adjusting staffing at locations, etc.).

In one example, the deployment functions 190 can be utilized to implement surge pricing functions, which can change or adjust the prices of products and/or services based on a supply or demand for those products and/or services. For example, the population surge metrics 511, movement tracking metrics 512, and/or demand metrics 513 included in the channel analysis data 180 for the channel 170 can be used to dynamically adjust the pricing for hotel rooms, ride hailing services, parking garage spaces, and/or other types of inventory based on the demand for the inventory within the channel 170. In some embodiments, one or more demand adjustment functions 195 can be used to directly adjust, or recommend adjusting, a pricing or resource allocation upon a detected surge. For example, the demand metrics 513 can be used to execute the demand adjustment functions 195. The demand adjustment functions 195 can be executed to adjust prices and/or inventory allocations for one or more inventory items in channels 170 based on the demand metrics 513 generated for the channels 170. In some embodiments, one or more demand adjustment functions 195 can be used to provide incentives to users, which can change user behavior, and thus change demand, during a demand surge.

In another example, the deployment functions 190 can be utilized by client systems 140 to reallocate inventory or resources based on the channel analysis data 180. For example, a client system 140 that provides ride-sharing services can reallocate drivers to regions or areas where demand is higher and/or expected to be higher. Along similar lines, a client system 140 that is affiliated with a restaurant within a channel 170 can place orders for additional inventory and/or adjusting staffing in scenarios where demand is higher and/or expected to be higher.

The channel analysis function 166 can include a real-time engine 167 and a predictive engine 168 according to certain embodiments. In certain embodiments, the real-time engine 167 and the predictive engine 168 can represent subroutines that are executed by a channel analysis function 166 for the user-sourced analytics platform 150 to generate channel analysis data 180 for the channel 170.

The real-time engine 167 can be configured to generate channel analysis data 180 pertaining to the current or real-time conditions of the channel 170, and the predictive engine 168 can be configured to generate channel analysis data 180 pertaining to predicted conditions of the channel 170 in one or more future time periods. For example, the real-time engine 167 can generate population surge metrics 511, movement tracking metrics 512, and demand metrics 513 indicating the real-time conditions of the channel 170, while the predictive engine 168 can generate population surge metrics 511, movement tracking metrics 512, and demand metrics 513 predicting conditions of the channel 170 in one or more future time periods. The future time periods can be near-term (e.g., the next 1, 2, 3, 4, 5, 6, 7, 8, 9, 10, 15, 20, 25, 30, 45, 60, 90, or 120 minutes), or longer-term. As explained above, the real-time engine 167 and predictive engine 168 can utilize various channel events 175 (e.g., indicating spending habits, schedule events, weather conditions, historical movements of individuals, population density, user-sourced data, etc.) to determine the current and future conditions of the channels.

The user-sourced analytics platform 150 can include an incentive analysis function 160. The incentive analysis function 160 can store and/or update incentive metrics 161, and/or can generate or determine which incentives to offer to users at certain times and in certain situations. The incentive analysis function 160 can determine which incentives to offer based on a current or predicted demand surge, the channel events 175, the channel analysis data 180, the user behavior data 173 and/or other information in the user profiles 172, the incentive metrics 161, incentive configurations provided by platform users, and/or other suitable inputs. The incentives offered can vary, and can include, for example, reward points, cryptocurrency, a coupon, a discount on a good or service, a free offer for a good or service, or other suitable incentives. In some embodiments, the incentives can be configured to change the user behavior from using a vertical or establishment associated with a demand surge to using a vertical or establishment not associated with the demand surge. In other embodiments, the incentives can be configured to change the user behavior from using a vertical associated with the demand surge at a current time to using the vertical associated with the vertical at a later time.

As an example, the incentive analysis function 160 can detect an active demand surge for ride-sharing services in a surge area within a channel 170 that has resulted in prices for the ride-sharing services tripling. The incentive analysis function 160 can generate an incentive that offers one or more users in the surge area an incentives (e.g., a discount on a later ride on the ride-sharing service, or a coupon for a cup of coffee in the general area of the users) to incentivize the users to wait and use the ride-sharing service later for a reduced price. Without this incentive, some users would nonetheless be willing to pay the surge prices and continue to escalate the demand, while other users may choose to not use the ride-sharing service at all in the face of the surge pricing. The incentive offered in this case could change such user behavior to reduce the demand surge yet maintain users over time for the ride-sharing service, and incentivize use of the vertical at a later time than initially desired by the user.

As another example, the user behavior data 173 can indicate that a certain user regularly pays surge pricing after baseball games to travel to restaurant several miles away from the baseball park. The incentive analysis function 160 can generate an incentive to offer the user a coupon for a restaurant within walking distance of the ballpark to help increase business at that restaurant near the ballpark. The incentive offered in this case could change such user behavior to reduce the demand surge in the ride-sharing vertical, and capitalize on the demand surge to increase business in another vertical, such as at a restaurant within walking distance from the surge area.

As yet another example, incentive analysis function 160 can use incentive metrics 161 to determine that a user with certain demographic characteristics is most likely to provide preference data 533 using sliders (e.g., such as shown in FIGS. 2-4) if a particular type of incentive is offered. The incentive analysis function 160 can recommend this incentive, of can recommend a ranked list of incentives based on the likelihood that the user will respond positively to the incentive by changing the user behavior to the desired user behavior.

As incentives are offered to users and users accept or decline the offers, user-sourced analytics platform 150 can track such responses and store this information and/or analytics about this information in the incentive metrics 161. As the incentive metrics 161 are updated over time, the inventive analysis function 160 can have more accurate data about the effectiveness of various incentives in various situations, which can improve the incentives generated by incentive analysis function 160. This continual updating and improvement of incentive metrics provides a feedback loop, which improves future incentive generation.

Figure 6:
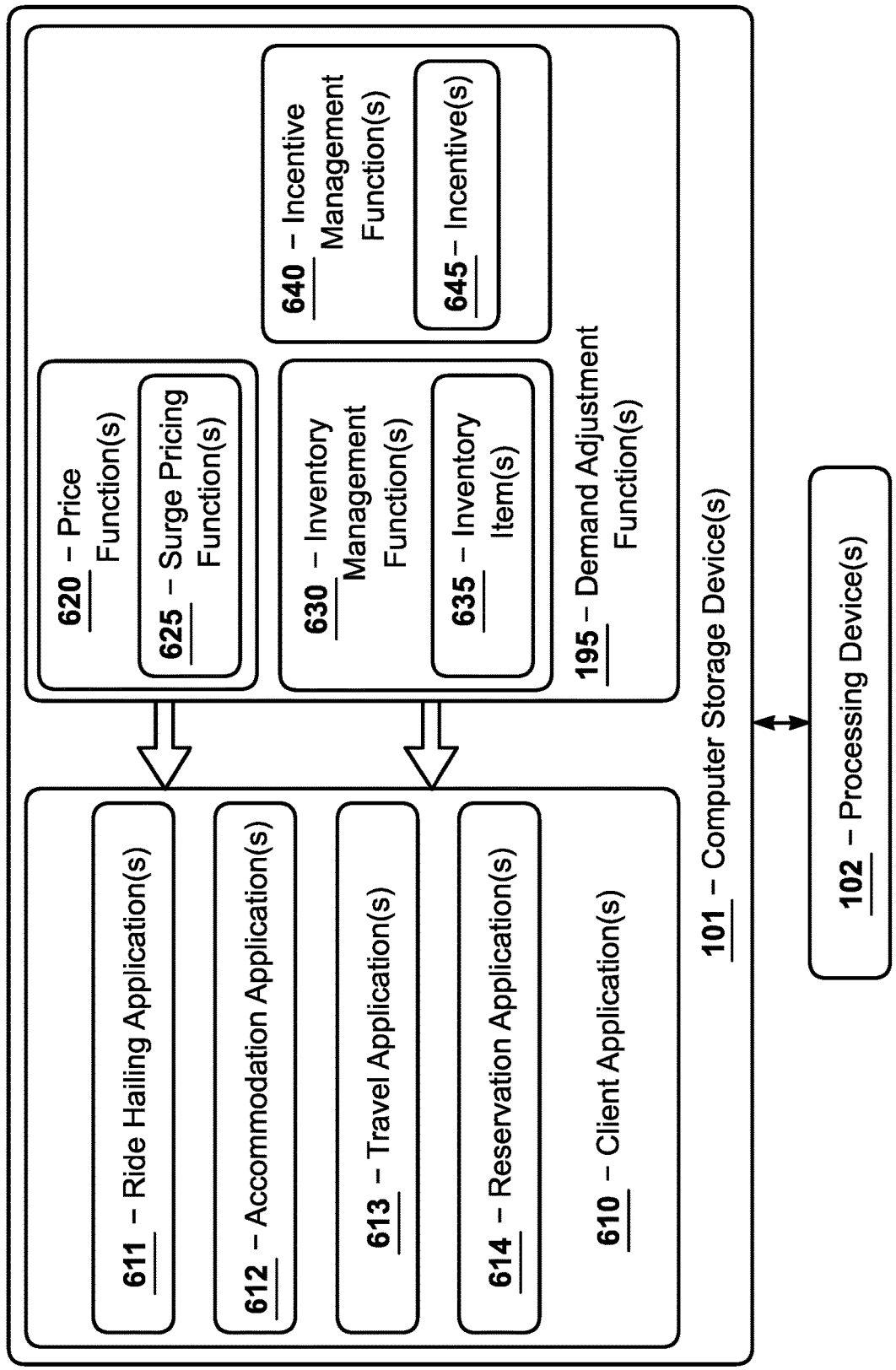
FIG. 6 is a block diagram of an exemplary client system according to certain embodiments.

FIG. 6 is a block diagram illustrating exemplary features, components, and/or functions of a client system 140 according to certain embodiments. The client system 140 can include one or computing devices 110 and/or one or more servers 120, each of which includes one or more computer storage devices 101 and one or more processing devices 102. The client system 140 can host and execute one or more client applications 610.

Exemplary client applications 610 provided by a client system 140 can include one or more of the following: 1) a ride hailing application 611 (e.g., an application that connects passengers with drivers to schedule rides); 2) an accommodation application 612 (e.g., an application that permits guests to schedule rooms or lodging); 3) a travel application 613 (e.g., an application that permits individuals to book schedule transportation with airlines, trains, buses, boats, etc.); and 4) a reservation application 614 (e.g., an application that permits individuals to schedule reservations or tickets for restaurants, concerts, events, bars, parking spaces, and/or other venues). Other types of client applications 610 also may be hosted and executed by the client systems 140. In certain embodiments, the client applications 610 can represent web-based applications that are accessible via a web browser and/or local applications (e.g., mobile apps) that is installed on devices (e.g., mobile devices or smart phones) operated by end-users.

The channel analysis data 180 (e.g., the population surge metrics 511, movement tracking metrics 512, demand metrics 513, and/or other data described herein) can be utilized to enhance various functionalities of the client applications 610. In some scenarios, the channel analysis data 180 can be utilized to enhance or implement one or more demand adjustment functions 195, such as a pricing function 620, an inventory management function 630, and/or an incentive management function 640, for each of the client applications 610. The demand adjustment functions 195 can be executed by user-sourced analytics platform 150 in some cases, and can be executed client system 140 in other cases. The demand adjustment functions 195 can be configured to adjust pricing and/or inventory information for inventory items, or provide incentives to users, based at least in part on actual or predicted supply metrics and/or demand metrics for the inventory items. The pricing function 620, inventory management function 630, and/or incentive management function 640 can be included with the functionality of each of the client applications 610, or can be included in separate applications that communicate with the client applications 610.

The pricing function 620 can utilize the channel analysis data 180 to determine pricing for one or more inventory items 635, which may generally include any type of product or service made available by a client application. For example, depending on the functionality of a given client application 610, the pricing function 620 can determine pricing for ride hailing services, taxi services, lodging accommodations, event tickets (e.g., for sporting events or concerts), airline tickets, train tickets, packing spaces, etc.

In some scenarios, the channel analysis data 180 can be utilized to implement a surge pricing function 625 for one or more of the client applications 610. A surge pricing function 625 generally represents a function that adjusts the price of one or more inventory items 635 based on the demand for the inventory items 635 (e.g., based on a comparison of the supply and the demand for the inventory items 635). The demand metrics 513 (and/or other channel analysis data 180) generated by the user-sourced analytics platform 150 may be utilized to dynamically adjust the pricing of one or more inventory items 635 offered by each of the client applications 610.

The inventory management function 630 can utilize the channel analysis data 180 to manage or adjust inventory items 635 in various ways. For example, the inventory management function 630 can detect when additional inventory items 635 should be ordered to accommodate a current demand for inventory items 635 and/or a predicted future demand for inventory items 635. In some scenarios, the inventory management function 630 also can be configured to automatically place an order for additional inventory items 635 to accommodate a spike in a current or predicted demand for the inventory items 635.

The inventory management function 630 also can reallocate inventory items 635 to accommodate varying supply and demand metrics across different channels 170 and/or within a given channel 170. For example, in some scenarios, a merchant may have multiple business locations, including multiple locations within a given channel 170 and multiple locations situated outside the channel 170. The inventory management function 630 can utilize the channel analysis data 180 to dynamically reallocate inventory items 635 among the business locations in within the given channel 170 to accommodate the varying demands at those locations and/or to maximize sales of inventory items 635 across all locations. Similarly, the inventory management function 630 can utilize the channel analysis data 180 to dynamically reallocate inventory items 635 from a location in one channel 170 to one or more separate channels in order to accommodate the varying demands in each channel 170 and/or to maximize sales of inventory items 635 across all channels 170.

The incentive management function 640 can utilize the channel analysis data 180, the output of the incentive analysis function 160, the incentive metrics 160, the user behavior data 173, and/or other suitable data, to provide incentives to a client application 610 to be provided to users, or providing the incentives directly to the users. In some cases, the incentive analysis function 160 can included in, or triggered by, the incentive management function 640, or vice versa. In some scenarios, the incentive management function 640 can be configured to automatically send incentives 645 (such as the incentives described above) to users, such as in the face of a spike in a current or predicted demand with the channel 170.

In certain embodiments, the client applications 610 can additionally, or alternatively, be stored on and executed by the user-sourced analytics platform 150. Similarly, the demand adjustment functions 195 (e.g., including the pricing function 620, the surge pricing function 625, the inventory management function 630, and/or the incentive management function 640) can be stored on and executed by the user-sourced analytics platform 150.

For example, in certain embodiments, the user-sourced analytics platform 150 can be utilized to execute the demand adjustment functions 195. In addition to generating the channel analysis data 180, user-sourced analytics platform 150 can execute one or more demand adjustment functions 195 for the channel 170. In one example, user-sourced analytics platform 150 can execute a surge pricing function 625 that utilizes the channel analysis data (e.g., the population surge metrics 511 and/or demand metrics 513) to dynamically adjust the pricing of one or more inventory items 635. In another example, user-sourced analytics platform 150 can execute an inventory management function 630 that dynamically allocates or reallocates inventory items 635 within a channel 170 and/or among a plurality of channels 170. In yet another example, user-sourced analytics platform 150 can execute an incentive management function that can generate incentives for users and/or provide incentives to users.

Figure 7:
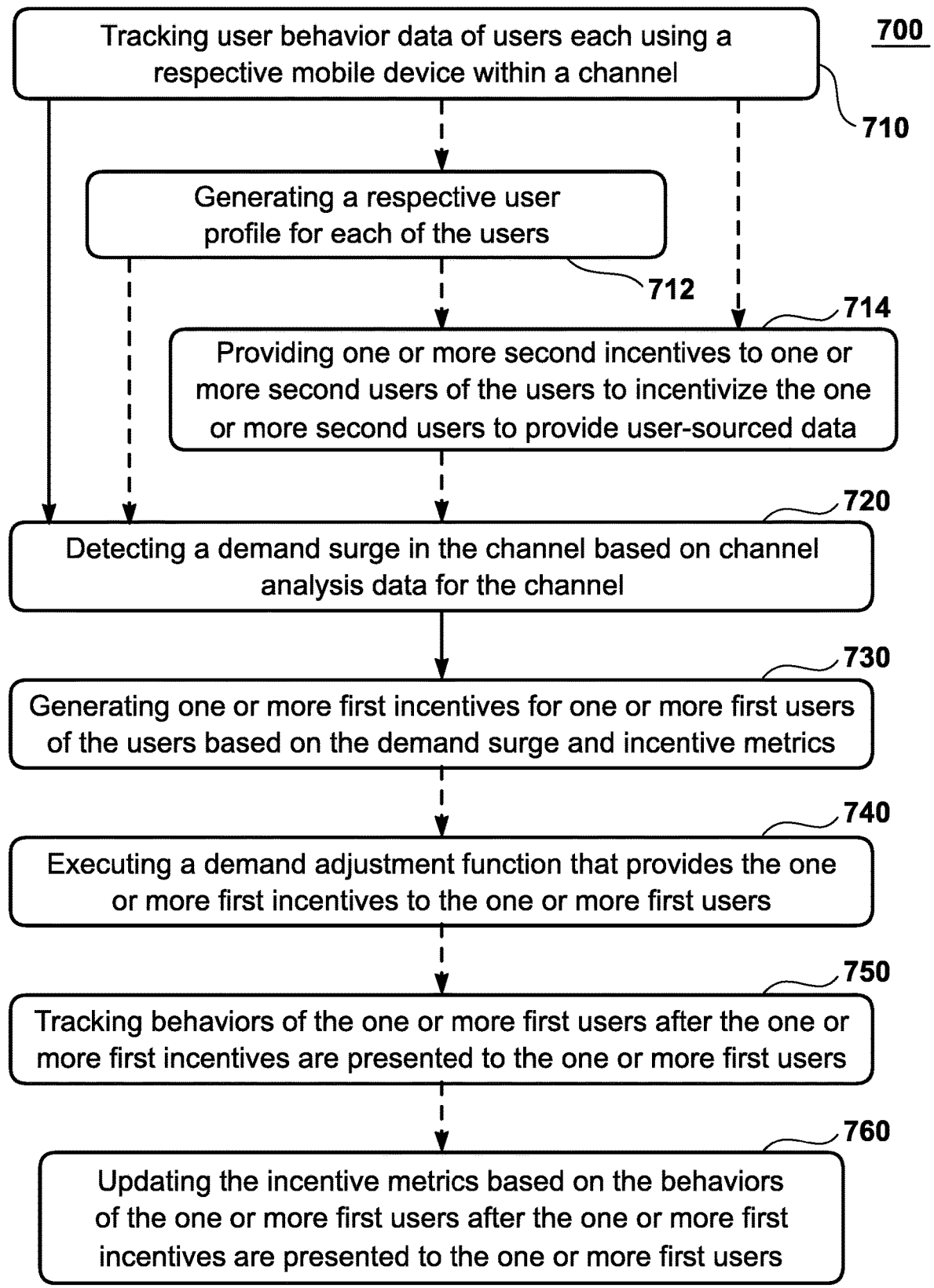
FIG. 7 is a flowchart illustrating an exemplary method according to certain embodiments.

FIG. 7 illustrates a flow chart for an exemplary method 700 according to certain embodiments. Method 700 is merely exemplary and is not limited to the embodiments presented herein. Method 700 can be employed in many different embodiments or examples not specifically depicted or described herein. In some embodiments, the steps of method 700 can be performed in the order presented. In other embodiments, the steps of method 700 can be performed in any suitable order. In still other embodiments, one or more of the steps of method 700 can be combined or skipped. In many embodiments, system 100, user-sourced analytics platform 150 can be configured to perform method 700 and/or one or more of the steps of method 700. In these or other embodiments, one or more of the steps of method 700 can be implemented as one or more computer instructions configured to run at one or more processing devices 102 and configured to be stored at one or more non-transitory computer storage devices 101. Such non-transitory memory storage devices 101 can be part of a computer system such as system 100 or user-sourced analytics platform 150.

Step 710 includes tracking user behavior data of users each using a respective mobile device within a channel. In certain embodiments, the user behavior data can be stored in the user-source analytics platform 150, such as in user behavior data 173.

An optional step 712 includes generating a respective user profile for each of the users. In certain embodiments, the respective user profile is based at least in part on the user behavior data.

An optional step 714 includes providing one or more second incentives to one or more second users of the users to incentivize the one or more second users to provide user-sourced data. In certain embodiments, the user-sourced data can be stored in user-sourced analytics platform 150, such as in user profiles 172. In certain embodiments, the user-sourced data can comprise at least one of user demographic data, user preference data, user transaction data, or reasons for actions taken or not taken.

Step 720 includes detecting a demand surge in the channel based on channel analysis data for the channel. In certain embodiments, the channel analysis data for the channel can be based channel events for the channel.

Step 730 includes generating one or more first incentives for one or more first users of the users based on the demand surge and incentive metrics. In certain embodiments, the one or more first incentives can be configured to change user behavior of the one or more first users. In certain embodiments, the one or more first incentives can be configured to change the user behavior of the one or more first users from using a vertical associated with the demand surge to using a vertical not associated with the demand surge. In certain embodiments, the one or more first incentives are configured to change the user behavior of the one or more first users from using a vertical associated with the demand surge at a current time to using the vertical associated with the demand surge at a later time after the current time.

At least one of the one or more first incentives or the one or more second incentives can comprise at least one of reward points, cryptocurrency, a coupon, a discount on a good or service, or a free offer for a good or service.

An optional step 740 includes executing a demand adjustment function that provides the one or more first incentives to the one or more first users.

An optional step 750 includes tracking behaviors of the one or more first users after the one or more first incentives are presented to the one or more first users.

An optional step 760 includes updating the incentive metrics based on the behaviors of the one or more first users after the one or more first incentives are presented to the one or more first users.

The techniques described in this disclosure provide a technical solution (e.g., that combine location tracking and predictive technologies) for overcoming the limitations associated with known techniques. This technology-based solution marks an improvement over existing capabilities and functionalities related to processing data across multiple channels or geographic areas.

In certain embodiments, the techniques described herein can be utilized continuously at a scale that cannot be reasonably performed using manual techniques or the human mind. For example, in many embodiments, real-time information from large numbers of channels or geographic areas can be simultaneously processed and analyzed to provide real-time updates to client systems. This simultaneous processing of real-time data cannot be performed by a human mind.

Additionally, in certain embodiments, the techniques described herein solve a technical problem that arises only within the realm of computer networks, as predictive models in computer networks or architectures do not exist outside the realm of computer networks.

Various embodiments include a computerized method comprising: (1) tracking user behavior data of users each using a respective mobile device within a channel; (2) detecting a demand surge in the channel based on channel analysis data for the channel, wherein the channel analysis data for the channel are based channel events for the channel; and (3) generating one or more first incentives for one or more first users of the users based on the demand surge and incentive metrics, wherein the one or more first incentives are configured to change user behavior of the one or more first users.

A number of embodiments include a system comprising one or more computing devices configured to perform: (1) tracking user behavior data of users each using a respective mobile device within a channel; (2) detecting a demand surge in the channel based on channel analysis data for the channel, wherein the channel analysis data for the channel are based channel events for the channel; and (3) generating one or more first incentives for one or more first users of the users based on the demand surge and incentive metrics, wherein the one or more first incentives are configured to change user behavior of the one or more first users.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid-state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

It should be recognized that any features and/or functionalities described for an embodiment in this application can be incorporated into any other embodiment mentioned in this disclosure. Moreover, the embodiments described in this disclosure can be combined in various ways. Additionally, while the description herein may describe certain embodiments, features, or components as being implemented in software or hardware, it should be recognized that any embodiment, feature, or component that is described in the present application may be implemented in hardware, software, or a combination of the two.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

The invention claimed is:

1. A computerized method for responding to demand surges in a channel, the method comprising:
   providing a user-sourced analytics platform configured to assess real-time demand analytics across geographic regions, the user-sourced analytics platform performing the steps of:
   tracking user behavior data for a plurality of users, each of the plurality of users using a respective mobile device within the channel, wherein tracking user behavior data for the plurality of users comprises:
   (i) storing, at one or more servers, user-profile data for the plurality of users; and
   (ii) receiving, at one or more servers, channel event data for a channel corresponding to a geographic region, the channel event data at least including dynamic location data identifying locations of a subset of the plurality of users located within the channel;
   generating, using the received channel event data, channel analytics data corresponding to the channel, the channel analytics data including a demand metric that indicates a demand within the channel for an item or a service;
   interfacing, via an application programming interface, the user-sourced analytics platform with a client system, the application programming interface enabling the client system to access or receive the channel analytics data;

detecting, at the client system or user-sourced analytics platform, a demand surge for the item or the service associated with the channel based, at least in part, on the demand metric generated for the channel; and in response to detecting the demand surge, executing, at the client system or user-sourced analytics platform, a demand adjustment function for the item or the service in the channel corresponding to the detected surge, wherein:
  (i) executing the demand adjustment function includes executing an incentive analysis function that generates or selects one or more incentives to cause a downward adjustment in the demand for the item or the service corresponding to the detected demand surge;
  (ii) the one or more incentives are identified or selected based, at least in part, on the user-profile data associated with the subset of users; and
  (iii) the client system or user-sourced analytics platform provides the one or more incentives to at least a portion of the subset of users that are detected as being physically located in the channel; and executing, by the user-sourced analytics platform, a feedback loop that dynamically utilizes real-time data to continuously reduce the demand in the geographic region where the demand surge is detected by:
  (i) tracking real-time user responses to the one or more incentives, the real-time user responses comprising user behavior data indicating acceptance, rejection, or utilization of the one or more incentives; and
  (ii) automatically updating incentive selection parameters utilized by the incentive analysis function to select the one or more incentives and/or the demand metric utilized to predict the demand within the channel, such that subsequent demand predictions account for the real-time user responses and/or subsequent generation or selection of incentives are adaptively adjusted to reduce the demand in the geographic region where the demand surge was detected based on the real-time user responses.

2. The computerized method of claim 1, wherein:
the incentive analysis function generates or selects the one or more incentives to flatten the demand for the item or the service in the channel detected as having the demand surge.

3. The computerized method of claim 1, wherein:
the incentive analysis function generates one or more incentive metrics that track or monitor performance of the one or more incentives with respect to impacting the demand for the item or the service; and
the feedback loop updates the one or more incentive metrics based, at least in part, on the performance of the one or more incentives.

4. The computerized method of claim 1, wherein the incentive analysis function generates or selects the one or more incentives based, at least in part, on a distance from a location associated with the detected demand surge.

5. The computerized method of claim 1, wherein the incentive analysis function generates or selects the one or more incentives such that the one or more incentives are designed to cause a delay in usage of the item or the service in the channel associated with the detected demand surge.

6. The computerized method of claim 1, wherein:
the user-profile data for each user comprises behavior data characterizing the user's activity patterns; and
the incentive analysis function generates or selects the one or more incentives based on the behavior data for one or more users included in the subset of users.

7. The computerized method of claim 1, the method further comprising transmitting a notification to a merchant or a designated user of a client application within the channel.

8. The computerized method of claim 7, wherein the notification includes real-time data or predictive data relating to a supply of the item or the service in the channel, and the demand of the item or the service in the channel.

9. The computerized method of claim 1, the method further comprising transmitting the one or more incentives to a designated user of a client application within the channel and wherein the client application is a ride hailing application, an accommodation application, a travel application, or a reservation application.

10. The computerized method of claim 1, wherein the channel is a macro-level channel that corresponds to an entire continent, country, or state.

11. The computerized method of claim 1, wherein the channel is a micro-level channel that corresponds a particular county, city, town, or neighborhood.

12. The computerized method of claim 1, wherein the channel analytics data is generated in real-time.

13. The computerized method of claim 1, wherein the channel analytics data pertains to predicted conditions of the channel in a future time period.

14. A computerized system for responding to demand surges in a channel, the system comprising:
one or more computing devices comprising one or more processing devices and one or more non-transitory storage devices for storing instructions, wherein execution of the instructions by the one or more processing devices causes the one or more computing devices to:
  track, by a user-sourced analytics platform configured to assess real-time demand analytics across geographic regions, user behavior data for a plurality of users, each of the plurality of users using a respective mobile device within the channel, wherein tracking the user behavior data for the plurality of users includes:
    (i) storing, at one or more servers, user-profile data for the plurality of users; and
    (ii) receiving, at one or more servers, channel event data for a channel corresponding to a geographic region, the channel event data at least including dynamic location data identifying locations of a subset of the plurality of users located within the channel;
  generate, using the received channel event data, channel analytics data corresponding to the channel, the channel analytics data including a demand metric that indicates a demand within the channel for an item or a service;
  detect a demand surge for the item or the service associated with the channel based, at least in part, on the demand metric generated for the channel;
  in response to a detected demand surge, execute, a demand adjustment function for the item or the service in the channel corresponding to the detected surge, wherein:

(i) the demand adjustment function includes an incentive analysis function that generates or selects one or more incentives to cause a downward adjustment in the demand for the item or the service corresponding to the detected demand surge;

(ii) the one or more incentives are identified or selected based, at least in part, on the user-profile data associated with the subset of users; and (iii) a client system or the user-sourced analytics platform provides the incentive to at least a portion of the subset of users that are detected as being physically located in the channel; and execute, by the user-sourced analytics platform, a feedback loop that dynamically utilizes real-time data to continuously reduce the demand in the geographic region where the demand surge is detected by:

(i) tracking real-time user responses to the one or more incentives, the real-time user responses comprising user behavior data indicating acceptance, rejection, or utilization of the one or more incentives; and (ii) automatically updating incentive selection parameters utilized by the incentive analysis function to select the one or more incentives and/or the demand metric utilized to predict the demand within the channel, such that subsequent demand predictions account for the real-time user responses and/or subsequent generation or selection of incentives are adaptively adjusted to reduce the demand in the geographic region where the demand surge was detected based on the real-time user responses; and an application programming interface, the application programming interface enabling the client system to access or receive the channel analytics data.

15. The computerized system of claim 14, wherein:
the incentive analysis function generates or selects the one or more incentives to flatten the demand for the item or the service in the channel detected as having the demand surge.

16. The computerized system of claim 14, wherein:
the incentive analysis function generates one or more incentive metrics that track or monitor performance of the one or more incentives with respect to impacting the demand for the item or the service; and
the feedback loop updates the one or more incentive metrics based, at least in part, on the performance of the one or more incentives.

17. The computerized system of claim 14, wherein the incentive analysis function generates or selects the one or more incentives based, at least in part, on a distance from a location associated with the detected demand surge.

18. The computerized system of claim 14, wherein the incentive analysis function generates or selects the one or more incentives such that the one or more incentives are designed to cause a delay in usage of the item or the service in the channel associated with the detected demand surge.

19. The computerized system of claim 14, wherein:
the user-profile data for each user comprises behavior data characterizing the user's activity patterns; and
the incentive analysis function generates or selects the one or more incentives based on the behavior data for one or more users included in the subset of users.

20. The computerized system of claim 14, wherein:
execution of the instructions by the one or more processing devices further causes the one or more computing devices to transmit a notification to a merchant or a designated user of a client application within the channel; and
the notification includes real-time data or predictive data relating to a supply of the item or the service in the channel, and the demand of the item or the service in the channel.

* * * * *